United States Patent
Matsubayashi et al.

(10) Patent No.: US 7,010,907 B2
(45) Date of Patent: Mar. 14, 2006

(54) EXHAUST GAS CLEANUP DEVICE FOR INTERNAL COMBUSTION ENGINE

(75) Inventors: Shogo Matsubayashi, Osaka (JP); Tohru Nakazono, Osaka (JP)

(73) Assignee: Yanmar Co., Ltd., Osaka (JP)

(*) Notice: Subject to any disclaimer, the term of this patent is extended or adjusted under 35 U.S.C. 154(b) by 76 days.

(21) Appl. No.: 10/474,727

(22) PCT Filed: Apr. 10, 2002

(86) PCT No.: PCT/JP02/03562

§ 371 (c)(1),
(2), (4) Date: Oct. 14, 2002

(87) PCT Pub. No.: WO02/084086

PCT Pub. Date: Oct. 24, 2002

(65) Prior Publication Data

US 2004/0112043 A1    Jun. 17, 2004

(30) Foreign Application Priority Data

Apr. 13, 2001  (JP) ............................. P2001-115470

(51) Int. Cl.
F01N 3/00    (2006.01)

(52) U.S. Cl. ............................. 60/277; 60/276; 60/295; 60/301

(58) Field of Classification Search ................. 60/277, 60/285, 289, 295, 301, 276
See application file for complete search history.

(56) References Cited

U.S. PATENT DOCUMENTS

| | | | |
|---|---|---|---|
| 5,388,406 A * | 2/1995 | Takeshima et al. ........... | 60/297 |
| 5,595,060 A | 1/1997 | Togai et al. .................. | 60/274 |
| 5,735,119 A | 4/1998 | Asanuma et al. ............. | 60/276 |
| 6,244,046 B1 * | 6/2001 | Yamashita .................... | 60/285 |
| 6,293,094 B1 * | 9/2001 | Schmidt et al. ............... | 60/284 |
| 6,345,498 B1 * | 2/2002 | Yonekura et al. ............. | 60/277 |
| 6,484,493 B1 * | 11/2002 | Takanohashi ................. | 60/277 |

FOREIGN PATENT DOCUMENTS

| | | |
|---|---|---|
| DE | 19944694 A | 8/2000 |
| DE | 100 27 738 A1 | 2/2001 |
| DE | 100 30 064 A1 | 4/2001 |
| EP | 0 930 425 A2 | 7/1999 |
| EP | 1 054 141 A1 | 11/2000 |
| JP | 2000-8909 | 1/2000 |
| JP | 2000-045752 | 2/2000 |
| JP | 2000-110552 A | 4/2000 |
| JP | 2000-345830 A | 12/2000 |
| JP | 2001-003735 | 1/2001 |

OTHER PUBLICATIONS

European Search Report.

* cited by examiner

*Primary Examiner*—Thomas Denion
*Assistant Examiner*—Diem Tran
(74) *Attorney, Agent, or Firm*—Crowell & Moring LLP (57) ABSTRACT

In an internal combustion engine (100) provided with an $NO_x$ absorbing reduction catalyst (2) in an exhaust gas passage (1), there are arranged: an oxygen sensor (3) which is mounted downstream of the $NO_x$ absorbing reduction catalyst (2) in the exhaust gas passage (1); and a determination means for determining a condition of degradation of the $NO_x$ absorbing reduction catalyst (2) on the basis of a time length, during which a voltage value, having a small amount of variation before the voltage value outputted from the oxygen sensor (3) is recorded as a maximum value when executing a rich spike, is recorded.

2 Claims, 7 Drawing Sheets

EXHAUST GAS CLEANUP DEVICE FOR INTERNAL COMBUSTION ENGINE

TECHNICAL FIELD

The present invention relates to an exhaust gas cleanup device for an internal combustion engine provided with a NOx absorbing reduction catalyst which locates in an exhaust gas passage.

BACKGROUND ART

In an internal combustion engine provided with a NOx absorbing reduction catalyst (hereinafter, referred to as absorbing catalyst) which locates in an exhaust gas passage, when NOx is absorbed by the absorbing catalyst up to a certain level, the NOx thus absorbed is reduced and removed by executing an operation called a rich spike by which an air-fuel ratio is switched temporarily and rapidly from leanness to richness.

As an invention of method for recovering the absorbing catalyst by the rich spike, there is a Japanese Laid-Open Patent Publication No. 2000-45752 (Method for Cleaning NOx Absorbing Reduction Catalyst in Internal Combustion Engine), the applicant of which is the same of the present application. In the invention of the Japanese Laid-Open Patent Publication No. 2000-45752, a consideration is given to a point that an absorbing ability of the absorbing catalyst is fully realized by taking the following two steps. As a first step, a possible absorbing capacity of NOx by the absorbing catalyst is monitored. As a second step, when (or before) the accumulated value of the NOx flowing in the absorbing catalyst reaches a possible absorbing capacity, the operation of the rich spike is executed to clean the absorbing catalyst.

The absorbing catalyst is, however, poisoned by a sulfuric component included in the exhaust gas, and the absorbing catalyst deteriorates with time passing so that the possible absorbing capacity of NOx decreases. As a method for removing the sulfuric component from the poisoned absorbing catalyst, there is a Japanese Laid-Open Patent Publication No. 2000-8909 (Method for Controlling Internal Combustion Engine), the applicant of which is the same of the present application. In the invention of the Japanese Laid-Open Patent Publication No. 2000-8909, when a predetermined time (100 minutes, for example) elapses while the internal combustion engine is operating, the air-fuel ratio is switched over from the leanness to the richness, and the absorbing catalyst is recovered by operating it during a predetermined time (approximately 100 minutes) under a condition that the temperature of the exhaust gas is more than 600° C.

In this way, according to the conventional art, to which degree the absorbing catalyst is poisoned by the sulfuric component is estimated only from the operation time of the internal combustion engine. That is, the recovering work is performed mechanically when the predetermined time passes, without monitoring the actual deteriorating condition of the absorbing catalyst. The "deterioration of the absorbing catalyst" means decrease of performance of cleanup of the absorbing catalyst on the basis of the poisoning by the sulfuric component and by heat.

DISCLOSURE OF INVENTION (Technical Object to Be Achieved by Invention)

The technical object is directed toward a provision of an exhaust gas cleanup device for an internal combustion engine, in which a condition of actual deterioration of the absorbing catalyst is monitored, and in which it is possible to recover the absorbing catalyst in a short time.

(How to Achieve the Technical Object)

According to the invention of claim 1, in order to achieve the aforementioned technical object, in an exhaust gas cleanup device of an internal combustion engine which is provided with an $NO_x$ absorbing reduction catalyst in an exhaust gas passage, there are provided: an oxygen sensor which is mounted downstream of the $NO_x$ absorbing reduction catalyst in the exhaust gas passage; and a determination means for determining a condition of deterioration of the $NO_x$ absorbing reduction catalyst on a basis of a time length, during which a voltage value, having a small amount of variation before the voltage value outputted from the oxygen sensor is recorded as a maximum value when a rich spike is executed, is recorded.

According to the invention of claim 2, in the invention of claim 1, there is provided an air-fuel ratio setting means for setting density of CO so as to increase the density of CO inside the exhaust gas passage which is upstream of the $NO_x$ absorbing reduction catalyst at a time of recovering the $NO_x$ absorbing reduction catalyst, as degree of the deterioration, determined by the determination means, of the $NO_x$ absorbing reduction catalyst becomes higher.

According to the invention of claim 3, in the invention of claim 2, an air-fuel ratio in the exhaust gas passage which is upstream of the $NO_x$ absorbing reduction catalyst is set so that the density of CO in the exhaust gas passage which is downstream of the $NO_x$ absorbing reduction catalyst is kept constant, at the time of recovering the $NO_x$ absorbing reduction catalyst.

According to the invention of claim 4, in the invention of one of claims 1–3, there are provided an exhaust gas flow rate detecting means; an $NO_x$ density detecting means for detecting density of $NO_x$ in an exhaust gas; a temperature sensor for detecting a temperature of the $NO_x$ absorbing reduction catalyst; and a calculating means for calculating amount of $NO_x$ flowing in the $NO_x$ absorbing reduction catalyst per unit time, from an exhaust gas flow rate detected by the exhaust gas flow rate detecting means and from an $NO_x$ density detected by the $NO_x$ density detecting means, wherein a possible $NO_x$ absorbing capacity of the $NO_x$ absorbing reduction catalyst is estimated by the temperature sensor, and wherein the $NO_x$ absorbing reduction catalyst is recovered when an accumulated amount of $NO_x$ flowing in the $NO_x$ absorbing reduction catalyst reaches a possible absorbing amount.

According to the invention of claim 5, in the invention of claim 4, the possible $NO_x$ absorbing capacity of the $NO_x$ absorbing reduction catalyst which is deteriorated, is estimated, and an interval for executing the rich spike is set in compliance with the possible $NO_x$ absorbing capacity.

According to the invention of claim 6, in the invention of one of claims 2 and 3, there are provided a secondary air supply passage and an oxidation catalyst, both of which are in the exhaust gas passage downstream of the $NO_x$ absorbing reduction catalyst, wherein CO having passed through the $NO_x$ absorbing reduction catalyst is oxidized in the oxidation catalyst.

According to the invention of claim 7, in the invention of claim 1, there is provided a three way catalyst which is in the exhaust gas passage upstream of the $NO_x$ absorbing reduction catalyst, wherein the three way catalyst has an oxygen absorbing function and an oxidizing function.

According to the invention of claim 8, in the invention of claim 7, the three way catalyst and the $NO_x$ absorbing reduction catalyst are unitized integrally, and the three way catalyst is upstream of the exhaust gas passage.

(More Advantageous Effect Than Prior Art)

According to the invention of claim 1, the CPU 4 compares the voltage data outputted from the oxygen sensor 3 in which the voltage data are about the absorbing reduction catalyst 2 that is not deteriorated and in which the voltage data are stored on the memory 5, and the waveform of the value, actually measured, of voltage outputted from the oxygen sensor 3 at the time of executing the rich spike, to each other. On the basis of the comparison, the degree of course of deterioration of the absorbing reduction catalyst 2 can be estimated. Therefore, it is possible to keep the absorbing reduction catalyst 2 in a condition for exerting the $NO_x$ absorbing function fully, and the $NO_x$ can be purged in good condition.

According to the invention of claim 2, there is provided the air-fuel ratio setting means (fuel supply amount adjustment valve) for setting the density of CO inside the exhaust gas passage (exhaust gas pipe 1) which is upstream of the $NO_x$ absorbing catalyst 2, in compliance with the degree of deterioration of the absorbing catalyst 2; therefore, the $NO_x$ absorbing catalyst 2 can be recovered in good condition. Consequently, always, the $NO_x$ can be purged in good condition.

According to the invention of claim 3, in the invention of claim 2, the air-fuel ratio $\lambda$ which is upstream of the $NO_x$ absorbing reduction catalyst 2 is set so that the density of CO which is downstream of the $NO_x$ absorbing reduction catalyst 2 is kept constant. Therefore, it is possible to make the time for recovering the absorbing catalyst 2 the shortest while the density of discharged CO is suppressed to a predetermined density within a value of an environmental limit. Consequently, it is possible to maintain the thermal efficiency high.

According to the invention of claim 4, the possible $NO_x$ absorbing capacity of the absorbing catalyst 2 is estimated, and the absorbing catalyst 2 is recovered when the total amount of $NO_x$ (accumulated amount of $NO_x$) flowing in the absorbing catalyst 2 reaches the possible $NO_x$ absorbing capacity. Therefore, it is possible to exert the absorbing ability of the absorbing catalyst 2 to the fullest extent.

Regardless of change in operational circumstances such as engine speed, engine load, etc., the total amount of the discharged $NO_x$ is calculated. Therefore, it is possible to properly determine the time to recover the absorbing catalyst 2, and the good absorbing ability can be exerted.

According to the invention of claim 5, the possible $NO_x$ absorbing capacity is estimated in compliance with the degree of deterioration of the absorbing catalyst 2, and the interval for performing the rich spike is set up. Therefore, the minimum necessary recovery can be performed in compliance with the degree of deterioration of the absorbing catalyst 2, the operation time can be the shortest with the air-fuel ratio $\lambda$ being rich, the discharge of CO can be made minimum, and the heat efficiency can be maintained high.

According to the invention of claim 6, there is arranged the oxidation catalyst 20 which is in the exhaust gas passage (exhaust gas pipe 1) downstream of the absorbing catalyst 2. Therefore, the discharge of CO which has not been employed upon recovery of the absorbing reduction catalyst 2, into the atmospheric air, is surely prevented. In other words, even if a large amount of CO, effective in the recovery, is flowed, the CO (CO which has not been employed for recovery) having passed through the absorbing catalyst 2 can undergo an oxidizing process by the oxidation catalyst 20. Therefore, the discharge of CO into the air can be prevented.

According to the invention of claim 7, there is arranged the three way catalyst 19 which is in the exhaust gas passage (exhaust gas pipe 1) upstream of the absorbing catalyst 2, and oxygen is absorbed upstream of the absorbing catalyst 2 by the three way catalyst 19 at the time of recovery of the absorbing catalyst 2. Therefore, the absorbing catalyst 2 can be recovered in good condition, and the good cleaning ability can be realized.

According to the invention of claim 8, the three way catalyst 19 and the absorbing catalyst 2 are unitized integrally, which are provided in the exhaust gas passage (exhaust gas pipe 1). Therefore, the temperature of the exhaust gas between the three way catalyst 19 and the absorbing catalyst 2, can be prevented from dropping down, and it is possible to recover the absorbing catalyst 2 at a high temperature. Therefore, the absorbing catalyst 2 can be surely recovered, and the absorbing catalyst 2 can make the $NO_x$ be cleaned up in good condition.

BEST MODE FOR CARRYING OUT THE INVENTION (Embodiment of Invention of Claim 1)

Figure 1:
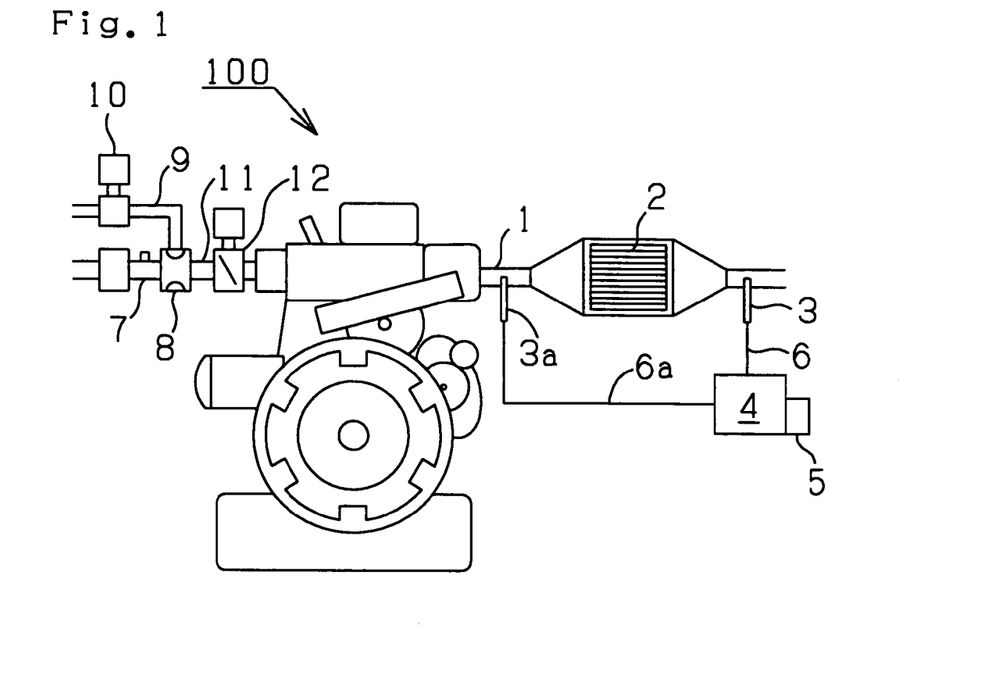
FIG. 1 is a schematic front view of an internal combustion engine which is embodied according to the invention of claim 1.

FIG. 1 is a schematic front view of an internal combustion engine 100 into which the invention of claim 1 is embodied. The internal combustion engine 100 has an exhaust gas pipe 1 with which an NOx absorbing reduction catalyst 2 (hereinafter, referred to as an absorbing catalyst 2) is unitized. In the exhaust gas passage (exhaust gas pipe 1) downstream of the absorbing catalyst 2, there is provided an oxygen sensor 3. Also, in the exhaust gas passage (exhaust gas pipe 1) upstream of the absorbing catalyst 2, there is provided an oxygen sensor 3a for precisely detecting the air-fuel ratio λ of the exhaust gas. Each of the oxygen sensors 3, 3a is connected to a CPU 4 through signal cables 6, 6a, respectively. Signals detected by the oxygen sensors 3, 3a, are transmitted to the CPU 4 through the signal cables 6, 6a. The CPU 4 is accessible to a memory 5 which will be explained in detail below.

Figure 2:
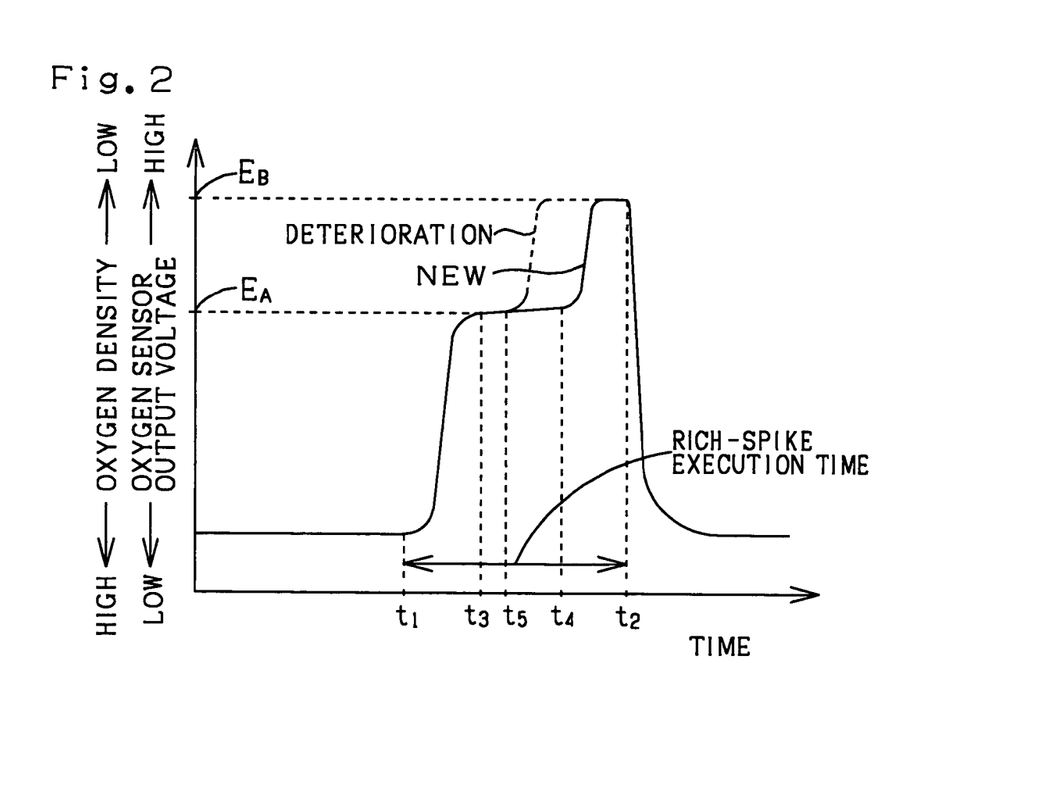
FIG. 2 is a graph showing a waveform of a voltage outputted from an oxygen sensor.

FIG. 2 is a graph showing a waveform of a voltage outputted from the oxygen sensor 3. The absorbing catalyst 2 shown in FIG. 1, absorbs NOx included in the exhaust gas flowing through the exhaust gas pipe 1. But the absorbing catalyst 2 can absorb no more NOx once the amount of absorption thereof reaches a possible absorbing capacity. When the amount of absorption reaches 90%, for example, of the possible absorbing capacity, an operation called rich spike is executed in order to set the air-fuel ratio λ slightly on a side of richness with respect to a theoretical air-fuel ratio.

Referring to FIG. 2, the rich spike is performed from time $t_1$ to time $t_2$. When the internal combustion engine 100 (FIG. 1) operates normally, the air-fuel ratio λ is set to be lean (λ=1.3~1.5). As the value of the air-fuel ratio λ is greater (namely, leaner), the density of oxygen is higher. As the oxygen density is higher, the voltage outputted from the oxygen sensor 3 decreases. Therefore, as shown in FIG. 2, since the oxygen density is low during the rich spike, the voltage outputted therefrom is high.

In FIG. 2, the value of the voltage hardly changes with respect to the value of $E_A$ during a time from $t_3$ to $t_4$ ("small amount of variation in voltage value" in claim 1), and the value thereof rapidly increases again after passing the time $t_4$. When the air-fuel ratio λ is lean, the absorbing catalyst 2 absorbs $NO_x$ and oxygen, simultaneously. When the rich spike is executed, the oxygen absorbed by the absorbing catalyst 2 is released, and the oxygen density in the exhaust gas pipe 1 downstream of the absorbing catalyst 2 becomes high temporarily. And, in spite of executing the rich spike until all the oxygen thus absorbed is released completely, the oxygen density hardly changes during the time from $t_3$ to $t_4$, which is reflected upon the value of voltage outputted from the oxygen sensor 3.

The rich spike is performed five seconds, for example. When the absorbing catalyst 2 is new, the oxygen absorbed thereby at the time $t_4$ is released completely. When the deterioration of the absorbing catalyst 2 proceeds, the oxygen absorbed thereby at the time $t_5$ before reaching the time $t_4$, is released completely, for example, as shown in FIG. 2.

When the absorbing catalyst 2 is new and it has a high ability to absorb it, the absorbing catalyst 2 absorbs a lot of $NO_x$ together with oxygen. However, when the absorbing catalyst 2 is employed during many hours, and when the deterioration (poisoning by the sulfuric component) of the absorbing catalyst 2 proceeds, the ability to absorb it decreases. As a result, the amount of oxygen released at the time of executing the rich spike becomes small. Therefore, when the absorbing catalyst 2 is deteriorated, all the oxygen at the time $t_5$ shown in FIG. 2 is released completely, and the value of the voltage increases up to the highest value $E_B$ at a relatively early stage.

Consequently, it is possible to know the degree of course of deterioration of the absorbing catalyst 2, on the basis of the waveform of the voltage outputted from the oxygen sensor 3. Accordingly, the correlation between the oxygen absorbing amount ($NO_x$ absorbing amount) of the $NO_x$ absorbing catalyst 2 and the waveform of the voltage, is gained by experiment in advance, and the correlation therebetween is stored on the memory 5 in FIG. 1. By comparing data stored on the memory 5 and the waveform of the value of voltage, actually measured, which is outputted from the oxygen sensor 3 at the time of executing the rich spike with the CPU 4, it is possible to estimate the degree of course of deterioration of the absorbing catalyst 2.

(Embodiment of Invention of Claim 2)

As shown in FIG. 1, an air supply pipe 7 and a fuel supply pipe 9 are connected to a mixer 8. A mixture formed in the mixer 8, is supplied from the mixer 8 to a combustion chamber (not shown) of the internal combustion engine 100 via a mixture supply pipe 11, and the mixture is made to combust in the combustion chamber.

The air-fuel ratio λ of the mixture supplied to the combustion chamber, can be changed by adjusting the valve travel of a fuel supply amount adjustment valve 10 which is provided intermediately in the fuel supply pipe 9. Namely, when the degree of the valve travel is made small, the amount of supply of the fuel decreases, and therefore the air-fuel ratio λ becomes high (i.e. becomes lean). On the contrary, when the degree of the valve travel is made large, the air-fuel ratio λ becomes low (i.e. becomes rich). The change of the air-fuel λ, in the vicinity of λ=1, is detected by the oxygen sensor 3a with high precision.

Figure 13:
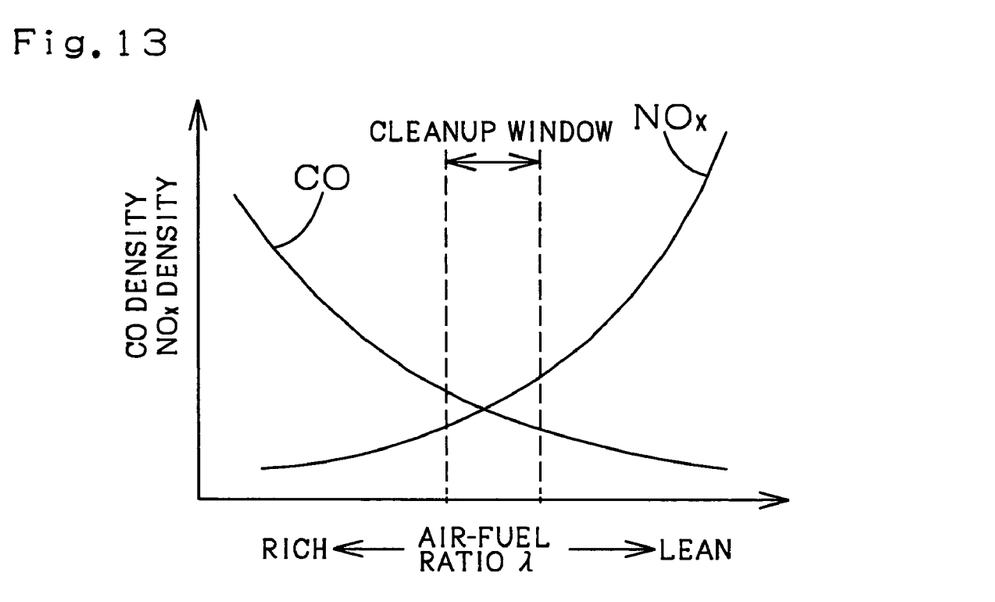
FIG. 13 is a graph showing a relation between the air-fuel ratio $\lambda$, and CO and NOx densities downstream of the absorbing catalyst.

FIG. 13 shows a graph indicating a relation amongst the air-fuel ratio λ, CO density and $NO_x$ density. As shown in FIG. 13, as the air-fuel ratio λ is richer, the density of CO downstream of the absorbing catalyst is higher and the density of $NO_x$ is lower. On the contrary, as the air-fuel ratio λ is leaner, the density of CO downstream of the absorbing catalyst is lower and the density of $NO_x$ is higher. The region in which both of the CO density and the $NO_x$ density are relatively low, is called a cleanup window.

The work for removing the sulfuric component from a deteriorated absorbing catalyst 2, is called a "recovery". When the absorbing catalyst 2 is recovered, the sulfuric component is removed from the absorbing catalyst 2, and the possible $NO_x$ absorbing capacity of the absorbing catalyst 2 is closer to the possible $NO_x$ absorbing capacity thereof when it is new.

Figure 10:
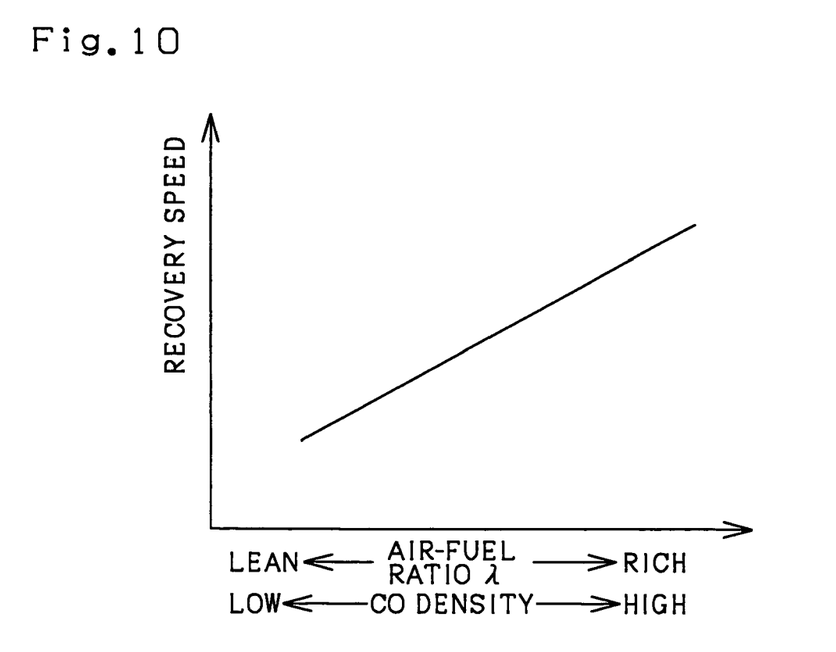
FIG. 10 is a graph showing a relation between recovering speed of the absorbing catalyst and air-fuel ratio $\lambda$.

As shown in FIG. 10, as the CO density is higher, the recovery speed is faster. The sulfuric component is advantageously removed with higher CO density. Hence, at the time of recovery thereof, the valve travel of the fuel supply amount adjustment valve (air-fuel ratio setting means) 10 is adjusted, and the air-fuel ratio λ is set to be on an end (λ=0.99–0.997) of the rich side of the cleanup window. At the same time, the internal combustion engine 100 is operated with such a temperature of the exhaust gas as allows the recovery. It is preferable that the temperature at this time is more than 600° C.

Figure 3:
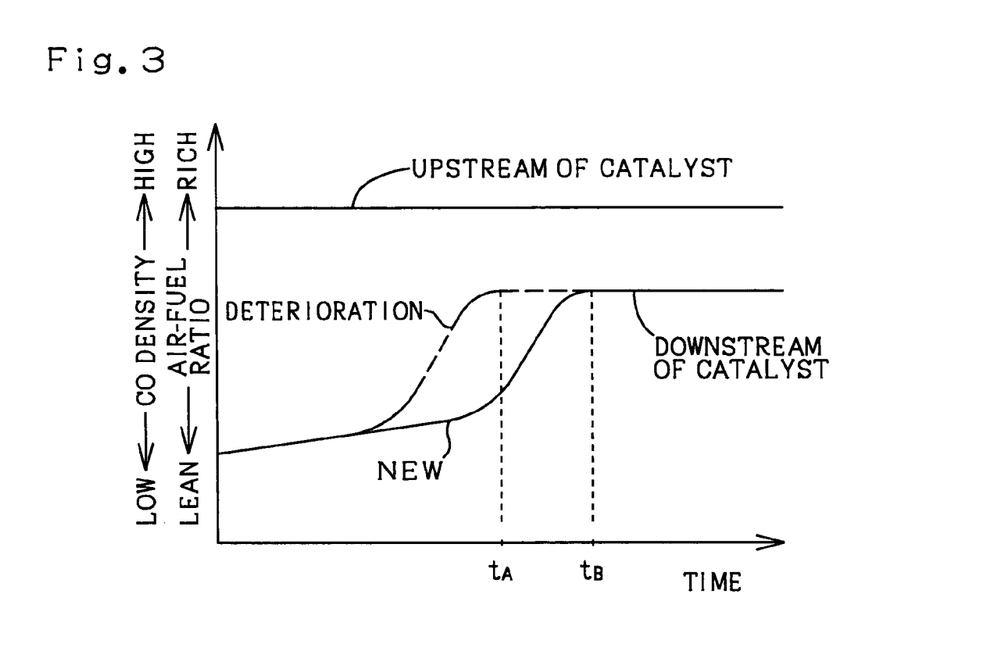
FIG. 3 is a graph showing a change in CO density upstream and downstream of an absorbing catalyst when time elapses.

As shown in FIG. 3, when the CO density upstream of the catalyst is kept constant, the CO density downstream of the absorbing catalyst becomes low initially. But when the time $t_A$ comes, the CO density downstream of the absorbing catalyst increases up to a predetermined value. When a new absorbing catalyst having a large possible absorbing capacity absorbs the $NO_x$ and oxygen up to a limitation of absorption, the amount of oxygen and $NO_x$ which is made to react with CO at the time of reduction of the absorbing catalyst increases. Therefore, there does not exist any object ($NO_x$ and oxygen) with which CO reacts, and it takes long before the CO density increases up to a predetermined value. But the possible absorbing capacity of the absorbing catalyst undergoing a considerable poisoning is small, and the amount of oxygen and $NO_x$ having been absorbed is small. Therefore, the amount of oxygen and $NO_x$ which is made to react with CO at the time of reduction of the absorbing catalyst is small, and the CO density increases up to the predetermined value when the time $t_A$, prior to the time $t_B$, comes.

Figure 4:
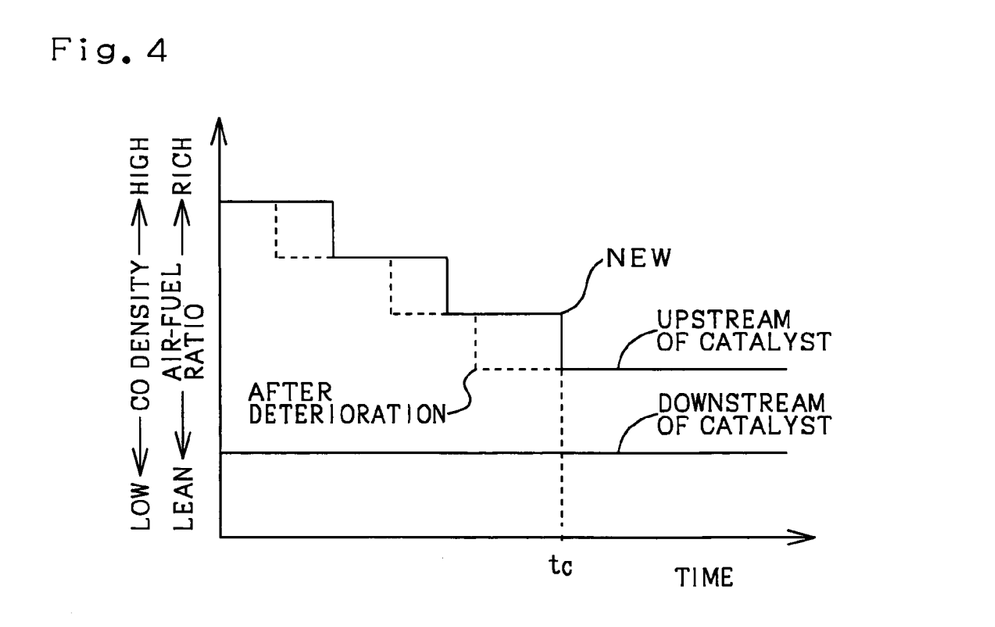
FIG. 4 is a graph showing a change in CO density upstream of the absorbing catalyst, with the CO density downstream of the absorbing catalyst being kept constant.

As shown in FIG. 4, when the CO density is set to be high initially at the time of recovery thereof, not so much of CO flows downstream of the absorbing catalyst. Accordingly, by setting the CO density upstream of the absorbing catalyst to be low in accordance with the degree of the recovery, it is possible to shorten the time to recover the absorbing catalyst while suppressing the CO density downstream of the absorbing catalyst.

In FIG. 4, the CO density downstream of the absorbing catalyst is set to be within an environmental discharge limit, and the CO density upstream of the absorbing catalyst is set so that the CO density downstream of the absorbing catalyst during the recovery of the absorbing catalyst become the set value. By heightening the CO density upstream of the absorbing catalyst in advance during the recovery so that the CO density downstream of the absorbing catalyst does not exceed the environmental limit, it is possible to shorten the time of the recovery of the absorbing catalyst with the density of CO in the exhaust gas being kept low.

Figure 14:
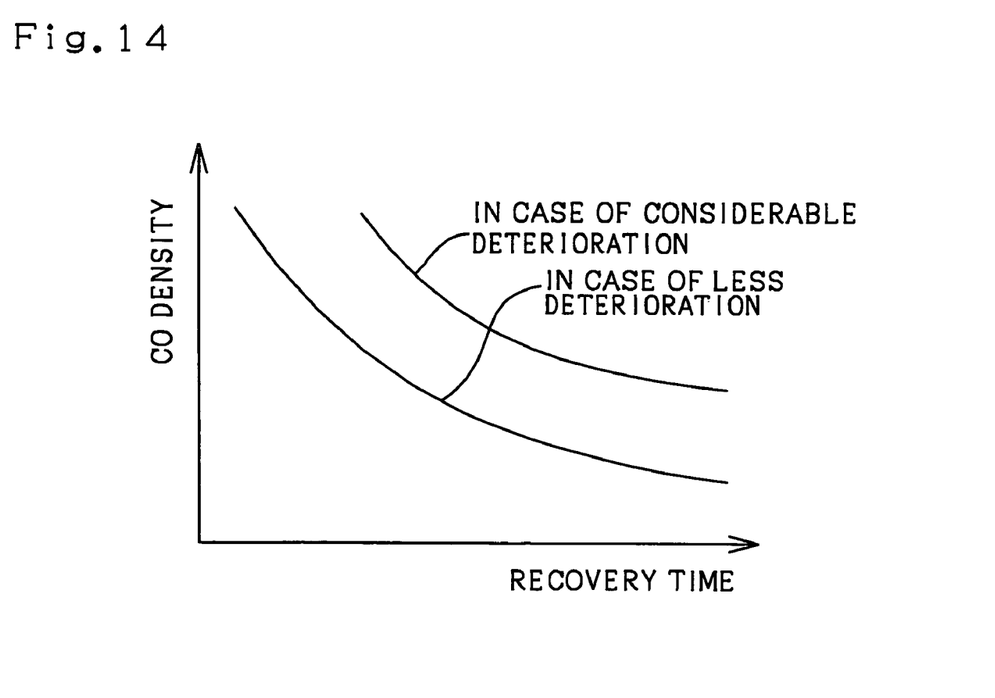
FIG. 14 is a graph showing a relation between a CO density set upstream of the absorbing catalyst and time when the recovery thereof has been accomplished, in a case that the absorbing catalyst is not deteriorated so much and in a case that the absorbing catalyst is deteriorated appreciably.

FIG. 14 shows a graph indicating a relation between a CO density set upstream of the absorbing catalyst and a time when the recovery is accomplished, in a case that the absorbing catalyst undergoes not so much deterioration and in a case that the absorbing catalyst undergoes considerable deterioration. As shown in FIG. 14, when the setting CO density is the same, the amount of poisoning increases as the deterioration thereof proceeds. Therefore, it takes longer before the recovery is finished. Also, making the recovery time the same, it is possible to set the CO density low at the time of recovery in a case that it undergoes less deterioration.

(Embodiment of Invention of Claim 3)

In the embodiment of the invention of claim 2, the air-fuel ratio λ upstream of the absorbing catalyst 2 is set so that the density of CO in the exhaust gas pipe 1 downstream of the absorbing catalyst 2 remains constant while the absorbing catalyst 2 is being recovered.

The deterioration of the absorbing catalyst 2 is patterned on the basis of the degree of deterioration, a map is made by investigating a relation between the density of Co set downstream and the density of CO adjusted upstream, in advance, and the map is stored on the memory 5.

The CPU 4 adjusts the valve travel of the fuel supply amount adjustment valve 10 so as to be able to properly adjust the density of CO upstream with reference to the map thus stored on the memory 5, by estimating the degree of the deterioration of the absorbing catalyst 2 from the waveform (FIG. 2) of the voltage outputted from the oxygen sensor 3, and by selecting a setting value of the density of Co downstream.

(Embodiment of Invention of Claim 4)

Figure 7:
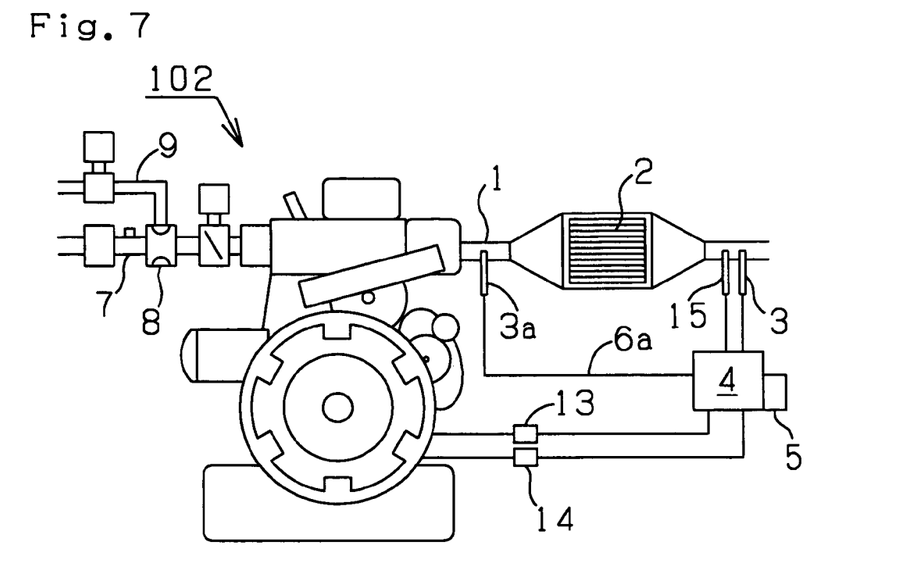
FIG. 7 is a schematic front view of the internal combustion engine which is embodied according to the invention of claim 4.
Figure 8:
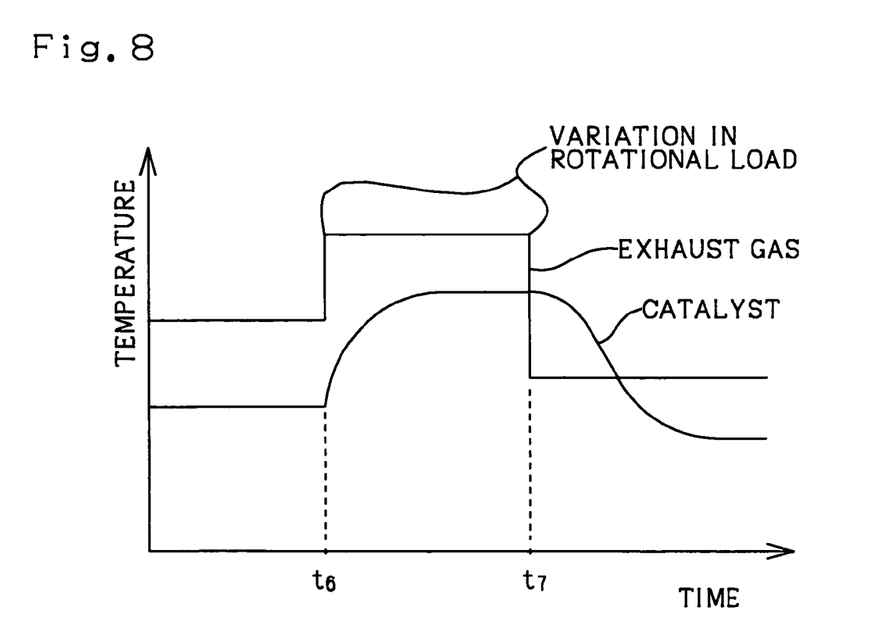
FIG. 8 is a graph showing a change in temperature of exhaust gas with time passing, when a condition of operation of the internal combustion engine of FIG. 7 changes.

As shown in FIG. 7, the internal combustion engine 102 has an engine speed detector 13 and an engine load detector 14. The detection signals having been detected thereby, are supplied to the CPU 4. Also, the exhaust gas pipe 1 has a temperature sensor 15. The CPU 4 estimates the temperature of the absorbing catalyst 2 from the temperature, detected by the temperature sensor 15, of exhaust gas.

Figure 5:
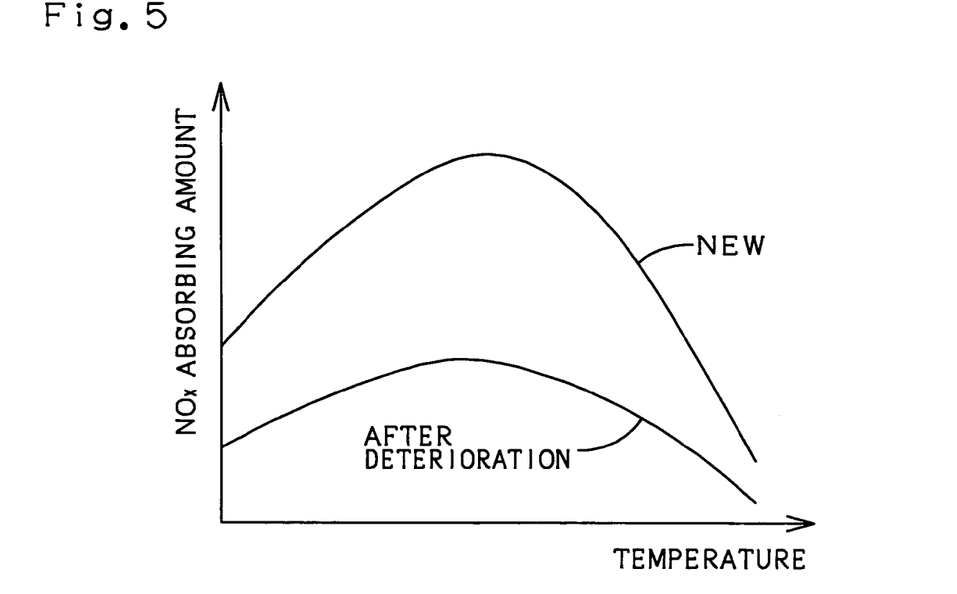
FIG. 5 is a graph showing a relation between temperature of the absorbing catalyst and possible NOx absorbing capacity.

FIG. 5 shows a graph indicating a relation between the temperature of the absorbing catalyst 2 and the $NO_x$ possible absorbing capacity. As shown in FIG. 5, the possible $NO_x$ absorbing capacity varies when the temperature becomes high, no matter whether the absorbing catalyst 2 is new or deteriorated. Therefore, it is possible to calculate the possible absorbing capacity thereof, from the degree of deterioration and temperature of the absorbing catalyst 2.

Figure 9:
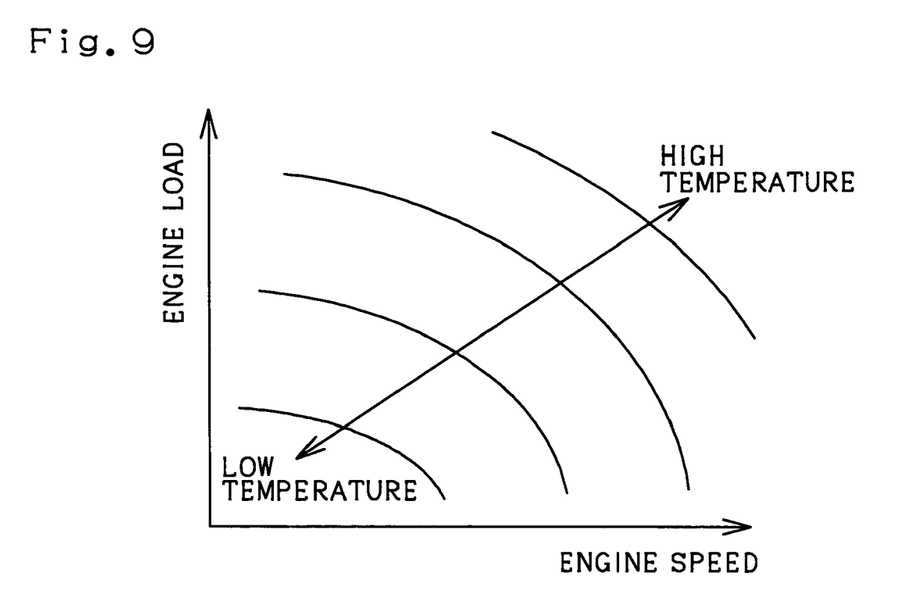
FIG. 9 is a graph showing a temperature distribution of the absorbing catalyst on the basis of the engine load and engine speed.

Firstly, the relation between the temperature and the possible absorbing capacity per degree of deterioration of the absorbing catalyst 2, is gained by experiment in advance, and then the map is made and stored on the memory 5. The temperature of the absorbing catalyst 2 changes in accordance with a state of operation of the internal combustion engine 102. The temperature thereof is detected by the temperature sensor 15, and the detection signal(s) detected thereby is/are transmitted to the CPU 4. Incidentally, as shown in FIG. 9, it is understood that the temperature of the exhaust gas (temperature of the absorbing catalyst 2) increases in each of the case that the engine load increases and the case that the engine speed increases.

The degree of deterioration of the absorbing catalyst 2 can be estimated from the waveform of the voltage outputted by the oxygen sensor 3 shown in FIG. 2. Consequently, the possible $NO_x$ absorbing amount at present by the absorbing catalyst 2 can be gained on the basis thereof.

Next, how much density the $NO_x$ which flows in the absorbing catalyst 2 has, is checked. It is possible to estimate the condition of operation of the internal combustion engine 100 from the air-fuel ratio λ, the engine speed detected by the engine speed detector 13, and the engine load detected by the engine load detector 14. On the basis of these, it is possible to detect the exhaust gas flow rate and the density of $NO_x$ included in the exhaust gas (exhaust gas flow rate detection means and $NO_x$ density detection means).

The amount per unit time of $NO_x$ which flows in the absorbing catalyst 2, is calculated by the CPU 4 ($NO_x$ amount calculation means). The CPU 4 performs the rich spike, when the amount thereof reaches 90–95%, for example, of the present possible absorbing capacity, calculated above, of the absorbing catalyst 2; and the $NO_x$ having been absorbed is reduced and removed. In this way, it is possible to bring out a full ability of the absorption in accordance with the deterioration of the absorbing catalyst 2, and possible to clean up the exhaust gas in good condition.

Of course, it is possible to absorb it until the total amount (accumulated $NO_x$ amount) of $NO_x$ calculated by the CPU 4 reaches 100% of the possible absorbing capacity of the absorbing catalyst 2, and it is possible to perform the rich spike thereafter. However, there is a possibility that the amount of $NO_x$ in the exhaust gas discharged to the atmospheric air increases. Therefore, it is preferable to set about 90–95% of the possible absorbing capacity as an upper limit, as aforementioned.

(Embodiment of Invention of Claim 5)

In the embodiment of claim 4, about 90–95% of the possible absorbing capacity of the absorbing catalyst 2 is set as the upper limit. At the time of reducing and removing the $NO_x$ having been absorbed, the rich spike is performed during the time which is necessary for reducing and removing the $NO_x$ the amount of which corresponds to the estimated amount of $NO_x$ computed by the CPU 4.

That is, the rich spike is performed after the lean operation time during which the amount of $NO_x$ (or about 90–95% of the possible absorbing capacity), corresponding to the possible absorbing capacity of the absorbing catalyst 2, is absorbed, elapses.

When the rich spike is executed in this way, it is possible to cleanup the absorbing catalyst in good condition, to suppress to a requisite minimum the amount of Co discharged when the air-fuel ratio λ is rich, and to suppress the decrease of the thermal efficiency to a minimum.

(Embodiment of Invention of Claim 6)

Figure 11:
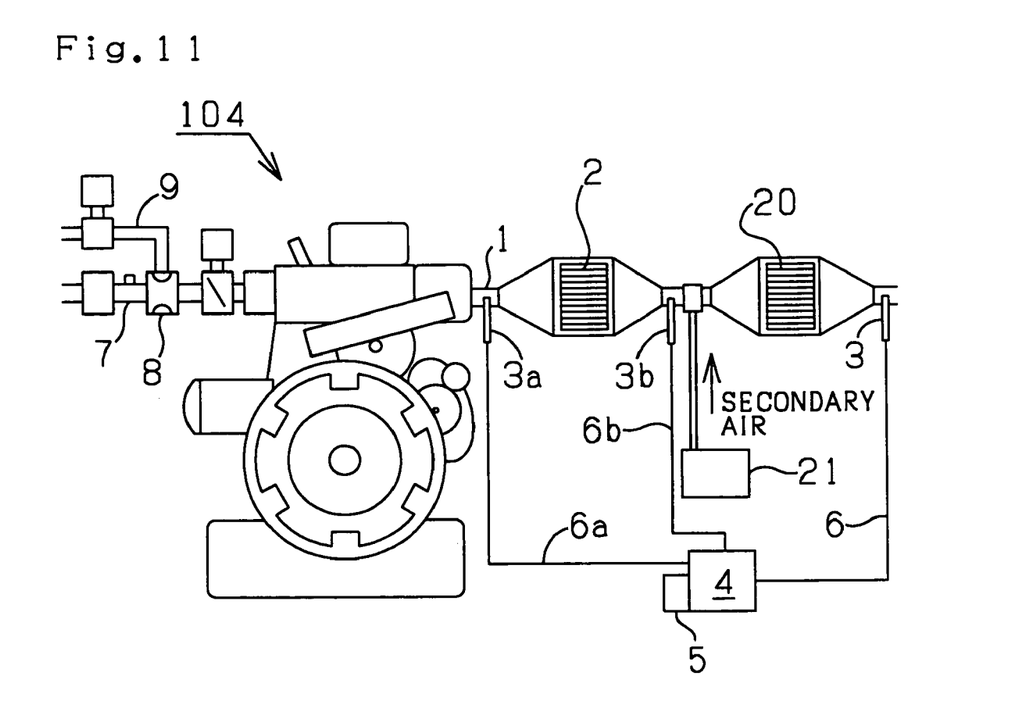
FIG. 11 is a schematic front view of the internal combustion engine which is embodied according to the invention of claim 6.

FIG. 11 is a schematic front view of the internal combustion engine 104 which is embodied in accordance with the invention of claim 6. According to the invention of the aforementioned claims 2 and 3, the air-fuel ratio λ at the time of recovering the absorbing catalyst 2, is set so that the density of CO in the exhaust gas pipe 1 upstream of the absorbing catalyst 2 is higher. But it is necessary to take a counter measure for preventing CO, which does not contribute to the cleanup of the $NO_x$ and $SO_x$ in the exhaust gas, from being discharged into the atmospheric air. Consequently, the internal combustion engine 104 has an arrangement in which an oxidation catalyst 20 is provided in the exhaust gas passage (exhaust gas pipe 1) downstream of the absorbing catalyst 2.

Further, the internal combustion engine 104 has a pump 21, for supplying the secondary air, which is mounted in the exhaust passage upstream of the oxidation catalyst 20. There is installed an oxygen sensor 3b between the pump 21 and the absorbing catalyst 2. The oxygen sensor 3b is necessarily mounted upstream of the pump 21 in order not to allow the oxygen sensor 3b to detect oxygen in the secondary air. The oxygen sensor 3b detects only the oxygen passing through the absorbing catalyst 2, and the oxygen sensor 3b fulfills a role for monitoring the absorbing capacity of the absorbing catalyst 2. Other constructions of the internal combustion engine 104 are the same as those of the internal combustion engine 100. Air supplied by the pump 21 oxidizes (i.e. cleans up) CO in the oxidation catalyst 20.

Incidentally, in the invention of claims 2 and 3, it is necessary to prevent a discharge of CO, which is excessively supplied, into the atmospheric air. Namely, in order to limit the amount of $NO_x$ or CO discharged to the atmospheric air to a minimum, it is necessary to relatively strictly control the air-fuel ratio.

In this respect, according to the invention of claim 6, the cleanup by the oxidation catalyst 20 can be done even if a bit excessive amount of CO is supplied, and it is easy to control the air-fuel ratio. Namely, in the internal combustion engine 104, the oxygen sensor 3a can be skipped.

(Embodiment of Invention of Claims 7 and 8)

Figure 6:
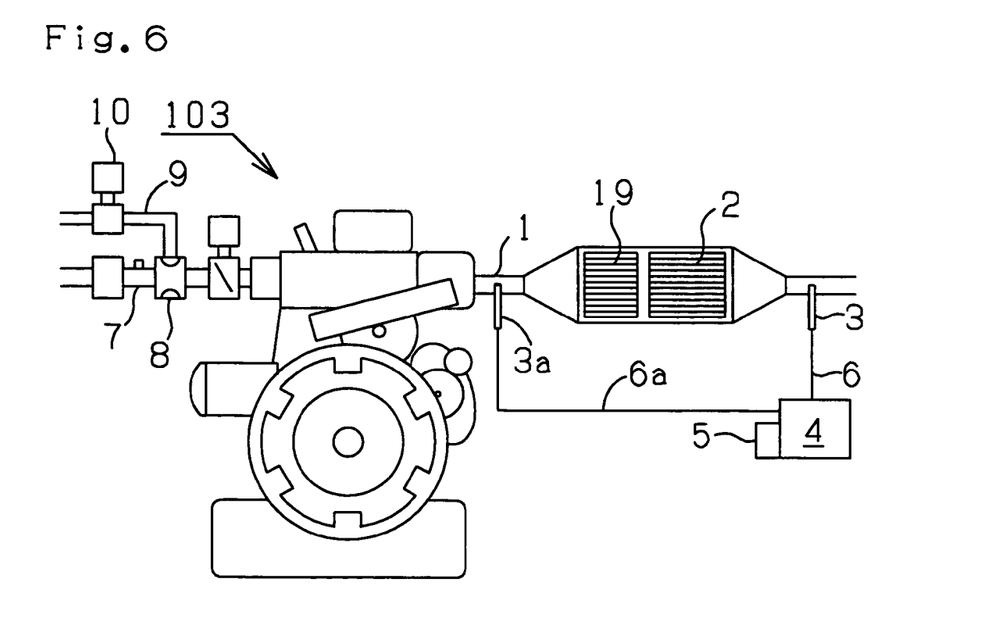
FIG. 6 is a schematic front view of the internal combustion engine which is embodied according to the invention of claims 7 and 8.

FIG. 6 is a schematic front view of the internal combustion engine 103 which is embodied in accordance with the invention of claims 7 and 8. The internal combustion engine 103 differs from the internal combustion engine 100, only in that a three way catalyst 19 is arranged upstream of the absorbing catalyst 2. However, the other constructions of the internal combustion engine 103 are the same as those of the internal combustion engine 100. Upon control of the air-fuel ratio λ, the fuel supply amount adjustment valve 10 is operated until the value of voltage outputted from the oxygen sensor 3a rapidly changes, and the air-ratio λ prior to the operation of the fuel supply amount adjustment valve 10 is detected on the basis of the operation amount of the fuel supply amount adjustment valve 10. This operation is called a lean spike. Upon the recovery of the absorbing catalyst 2, firstly, the lean spike is executed. After detecting what value the present air-fuel ratio λ is, the air-fuel ratio λ is shifted toward a rich side by an amount necessary to recover it.

When there exists oxygen, the recovery of the absorbing catalyst 2 is blocked. Therefore, it is necessary to remove oxygen generated at the time of execution of the lean spike, before the recovery work is started. Namely, the oxygen is absorbed by the three way catalyst 19 mounted upstream of the absorbing catalyst 2, and the oxygen is prevented from flowing to the absorbing catalyst 2 downstream.

As shown in FIG. 6, by unitizing the three way catalyst 19 and the absorbing catalyst 2, and by mounting the unit in the exhaust gas passage (exhaust gas pipe 1), the temperature of the exhaust gas between the three way catalyst 19 and the absorbing catalyst 2 is prevented from dropping down.

Figure 12:
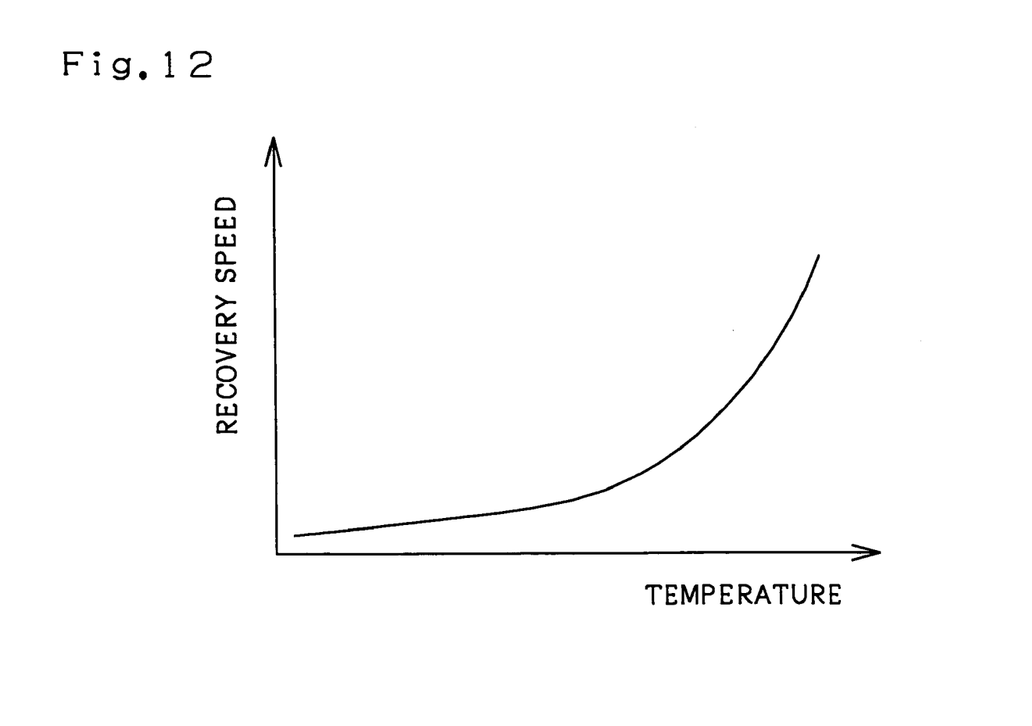
FIG. 12 is a graph showing a relation between the recovering speed of the absorbing catalyst and the temperature.

FIG. 12 is a graph showing a relation between the recovery speed and temperature of the absorbing catalyst 2. As shown in FIG. 12, the recovery speed of the absorbing catalyst 2 is higher as the temperature is higher. Therefore, in the internal combustion engine 103, the absorbing catalyst 2 can be recovered in a short time by the exhaust gas at a high temperature.

INDUSTRIAL APPLICABILITY

The present invention is applicable to internal combustion land and marine engines which are equipped with $NO_x$ absorbing reduction catalysts in the exhaust gas passages.

The invention claimed is:

1. An exhaust gas cleanup device of an internal combustion engine (100) which is provided with an $NO_x$ absorbing reduction catalyst (2) in an exhaust gas passage (1), the exhaust gas cleanup device thereof comprising:

an oxygen sensor (3) which is mounted downstream of the $NO_x$ absorbing reduction catalyst (2) in the exhaust gas passage (1);

a determination means for determining a condition of deterioration of the $NO_x$ absorbing reduction catalyst (2) on a basis of a time length, during which a voltage value, having a small amount of variation before the voltage value outputted from the oxygen sensor (3) is recorded as a maximum value when a rich-spike is executed, is recorded:

an exhaust gas flow rate detecting means;

an $NO_x$ density detecting means for detecting density of NO in an exhaust gas;

a temperature sensor (15) for detecting a temperature of the $NO_x$ absorbing reduction catalyst (2); and a calculating means for calculating amount of $NO_x$ flowing in the $NO_x$ absorbing reduction catalyst (2) per unit time, from an exhaust gas flow rate detected by the exhaust gas flow rate detecting means and from an $NO_x$ density detected by the $NO_x$ density detecting means, wherein a possible $NO_x$ absorbing capacity of the $NO_x$ absorbing reduction catalyst (2) is estimated by the temperature sensor (15), and wherein the $NO_x$ absorbing reduction catalyst (2) is recovered when an accumulated amount of $NO_x$ flowing in the $NO_x$ absorbing reduction catalyst (2) reaches a possible absorbing amount.

2. The exhaust gas cleanup device of the internal combustion engine as claimed in claim 1, wherein the possible $NO_x$ absorbing capacity of the $NO_x$ absorbing reduction catalyst (2) which is deteriorated, is estimated, and wherein an interval for executing the rich-spike is set in compliance with the possible $NO_x$ absorbing capacity.

* * * * *

UNITED STATES PATENT AND TRADEMARK OFFICE
CERTIFICATE OF CORRECTION

| | | |
|---|---|---|
| PATENT NO. | : 7,010,907 B2 | Page 1 of 1 |
| APPLICATION NO. | : 10/474727 | |
| DATED | : March 14, 2006 | |
| INVENTOR(S) | : Shogo Matsubayashi et al. | |

It is certified that error appears in the above-identified patent and that said Letters Patent is hereby corrected as shown below:

Title Page; should read;

§ 371 (c) (1),
(2), (4) Date: Oct. 14, 2003

Signed and Sealed this

Twelfth Day of September, 2006

JON W. DUDAS
*Director of the United States Patent and Trademark Office*